United States Patent [19]

Kessler

[11] 4,011,819

[45] Mar. 15, 1977

[54] STRESS RELIEVED MOLDED COVER ASSEMBLY AND METHOD OF MAKING THE SAME

[75] Inventor: Hyman Kessler, Silver Spring, Md.

[73] Assignee: The United States of America as represented by the Secretary of the Navy, Washington, D.C.

[22] Filed: Mar. 3, 1976

[21] Appl. No.: 663,313

[52] U.S. Cl. .......................... 102/70.2 P; 52/627;
220/200; 264/254; 264/255; 264/263;
264/267; 264/273; 264/274; 264/328
[51] Int. Cl.² .................. B29C 5/00; B29D 3/00;
B29F 1/00
[58] Field of Search .......... 264/250, 255, 261, 263,
264/267, 271, 273, 274, 328, 329, 254;
102/92.3, 70.2 P, 105; 343/712, 872, 708;
220/377, 200; 52/80, 309, 200, 627

[56] References Cited

UNITED STATES PATENTS

| | | | |
|---|---|---|---|
| 2,840,856 | 7/1958 | Moxness | 264/328 |
| 2,859,483 | 11/1958 | High et al. | 264/328 |

*Primary Examiner*—Willard E. Hoag
*Attorney, Agent, or Firm*—R. S. Sciascia; A. L. Branning

[57] ABSTRACT

Hoop stresses are relieved to eliminate the formation of cracks produced during the molding of a thermoplastic fitment cover about a support ring structure. Heated plastic is directly molded about the support ring to form any desired cover shape. Hoop stresses created in the cover as the fitment shrinks upon cooling are relieved by means of an interfacing cushion of elastomer. Variation in elastomer configuration provides the flexibility of allowing the elastomer to be "snapped-on" or to be directly molded onto the support ring.

11 Claims, 7 Drawing Figures

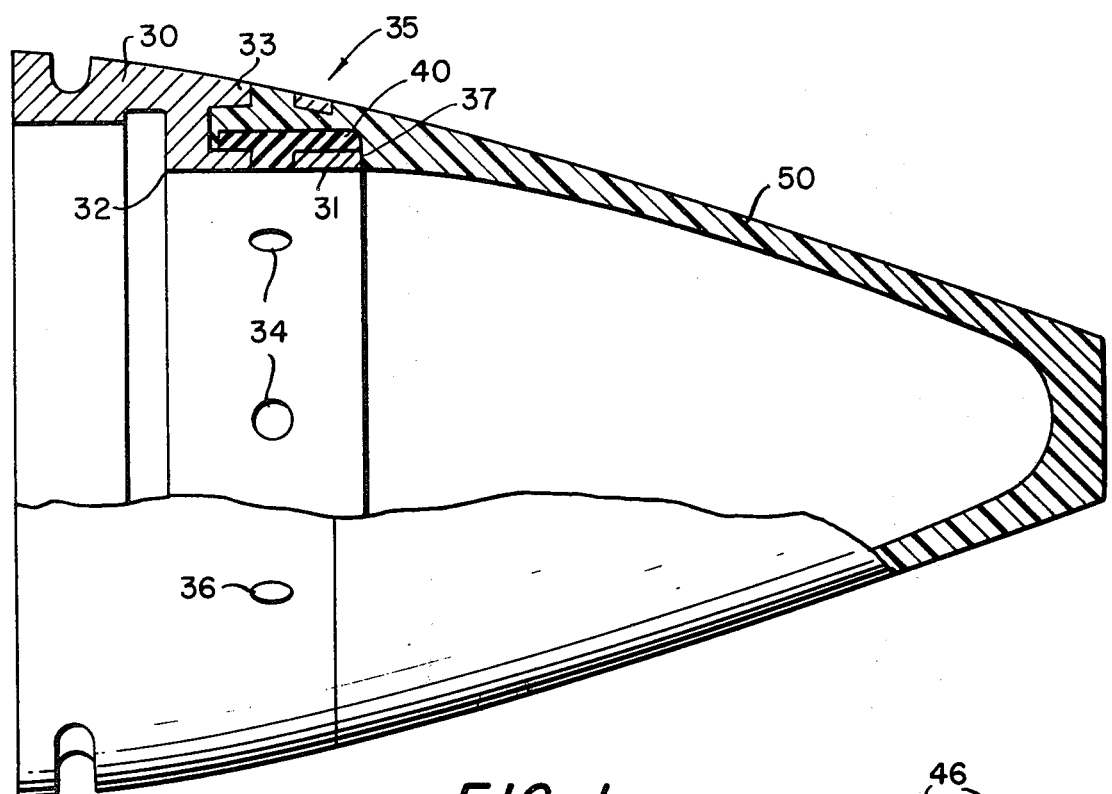
FIG. 1.
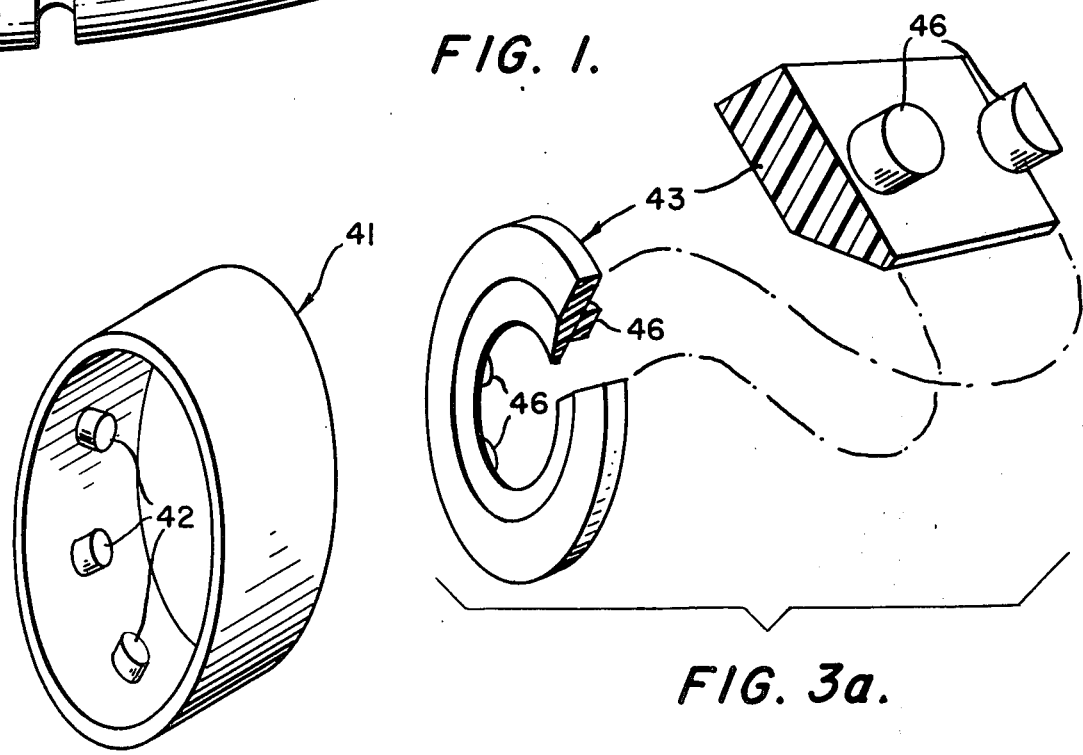
FIG. 2.
FIG. 3a.

STRESS RELIEVED MOLDED COVER ASSEMBLY AND METHOD OF MAKING THE SAME

BACKGROUND OF THE INVENTION

This invention relates generally to the injection molding of thermoplastic fitments and more particularly to a method for relieving hoop stresses in direct molding of thermoplastic fitments to eliminate cracks formed by the fitments shrinkage about a receiving base upon cooling.

There is an important need for molded fitments in conjunction with certain devices of ordnance, such as proximity fuzes. Two essential requirements proximity fuze front casings must meet to be operationally acceptable are that the fitment be "transparent" to the transmission of electromagnetic radiation signals and that the doomed fitment be aerodynamically shaped. Further constraints placed on the combination of a proximity fuze and fuze cover dome are that the fitment form a water tight seal and that the fitment be capable of engaging interlockingly with the front case assembly of the proximity fuze to withstand extreme rotational shearing forces as the proximity fuze is discharged.

In the past, providing a proximity fuze with a fitment dome was very expensive, both in terms of the basic cost of materials used as well as in terms of the time required to perform the fitment. Previously a Teflon fitment was made separate and apart from the base to which attachment was to be made. A liquid cement, such as Bostik 701, supplied by the B.B. Chemical Co., was applied continuously around the case before the Teflon dome was inserted thereon. A raised lip on the base was then crimped down about the dome with large compressive forces to securingly fasten the dome to the base. This process was not satisfactory as to method or as to machinery required to complete a fitment. Efforts to directly mold a fitment with plastics having similarly been unsatisfactory. After the molding was complete, cracks would still develop as late as perhaps a year after the fitment was formed, due to residual hoop stresses.

In many other diverse applications it is desirable to provide a receiving base with a molded plastic dome. It has been found useful, for example, to place lids on cans, jars, and other containments. In these applications, often neither the shape of the fitment nor the environment the fitment is expected to see is critical.

SUMMARY OF THE INVENTION

Accordingly, it is one object of this invention to provide a new and improved method for the direct molding of a fitment onto a receiver base.

Another object is to provide a simple and inexpensive method for molding a fitment onto a receiver base.

Another object is to provide a method for substantially increasing the resistance of molded fitments to crack formation.

Yet another object of this invention is to provide an effective method of sealing a fitment about a base.

A further object is to provide a fitment dome for a receiving base with an improved barrier to seal against water and moisture.

Another object is to provide a new and improved method for the relief of stresses.

Still another object is to provide a new and improved elastomer cushioning ring to relieve stresses.

Another object is to provide a novel method of directly molding a fitment onto a base which provides a new and improved combination fitment that is securingly locked to a receiving base and yet still provides the features of fitment stress relief, resistance to crack formation, and resistance to moisture.

Briefly, in accordance with one embodiment of this invention, these and other objects are attained with a receiver base which has a terminating tubular support ring for receiving the fitment and which is provided with a plurality of circumferentially spaced holes, whereon is placed a band of elastomer having a plurality of inwardly directed protrusions to coactively fill the holes of the supporting ring. The support ring is placed in an injection molding machine to be directly fitted with a plastic fitment that exhibits increased resistance to cracks due to an improved hoop stress distribution in the fitment upon cooling.

BRIEF DESCRIPTION OF THE DRAWINGS

Still other objects, advantages and features will become apparent by reference to the following detailed descriptions of a preferred embodiment of the apparatus and method and the appended claims. The various features of the exemplary embodiments according to the invention may be best understood with reference to the accompanying drawings wherein:

FIG. 1 shows a partial, sectioned side view of a preferred embodiment of the invention.

FIG. 2 illustrates a cylindrical "snap-on" band of elastomer.

FIGS. 3a – 3c illustrate sectional views of alternative elastomer "snap-on" bands.

DESCRIPTION OF THE PREFERRED EMBODIMENT

Figure 3B:
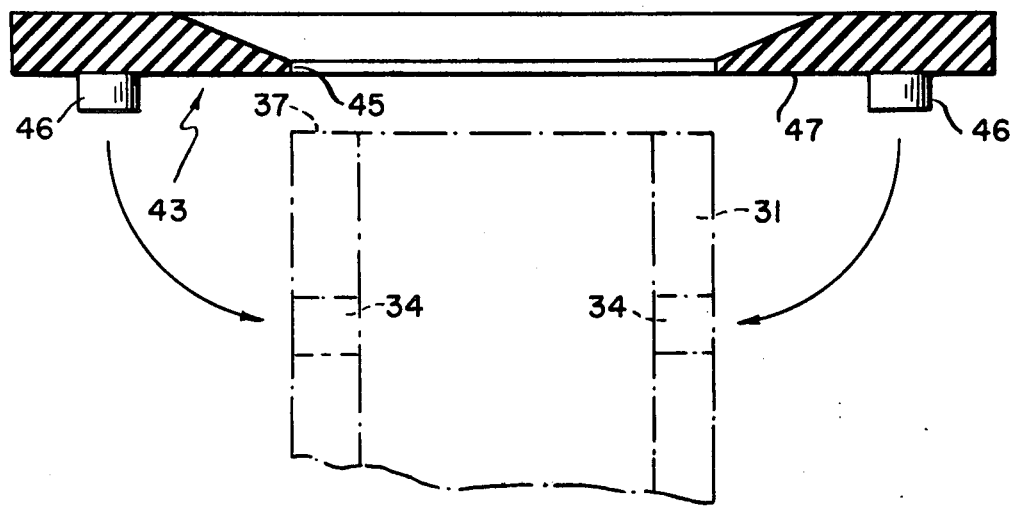

Referring now to the drawings wherein like reference characters designate identical or corresponding parts throughout the several views, and more particularly to FIG. 1 thereof, the resultant combination produced by the method of the present invention is shown as comprising an elastomer or rubber cushioning ring 40 interfaced between a tubular receiver base 30 and a plastic fitment 50.

Figure 4A:
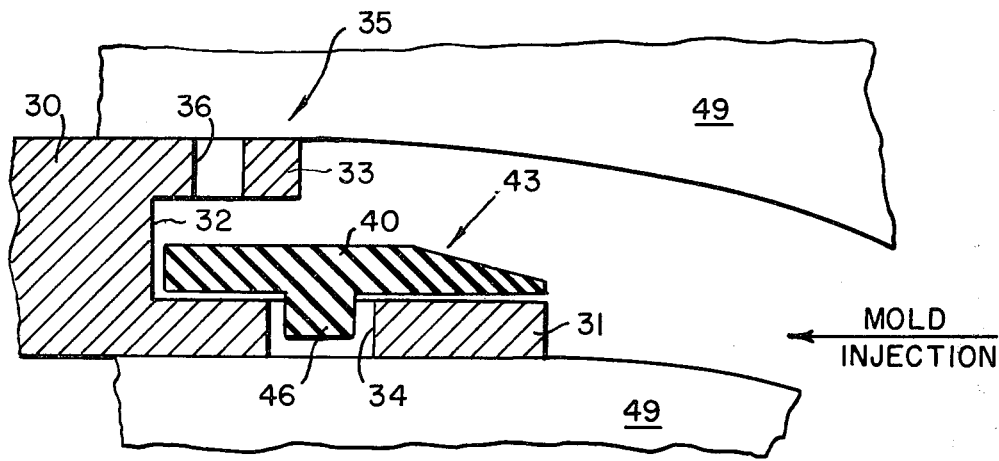
FIGS. 4a – 4b illustrate a sectional view of the receiver base with support rings placed in working relation with an injection molding machine.
Figure 4B:
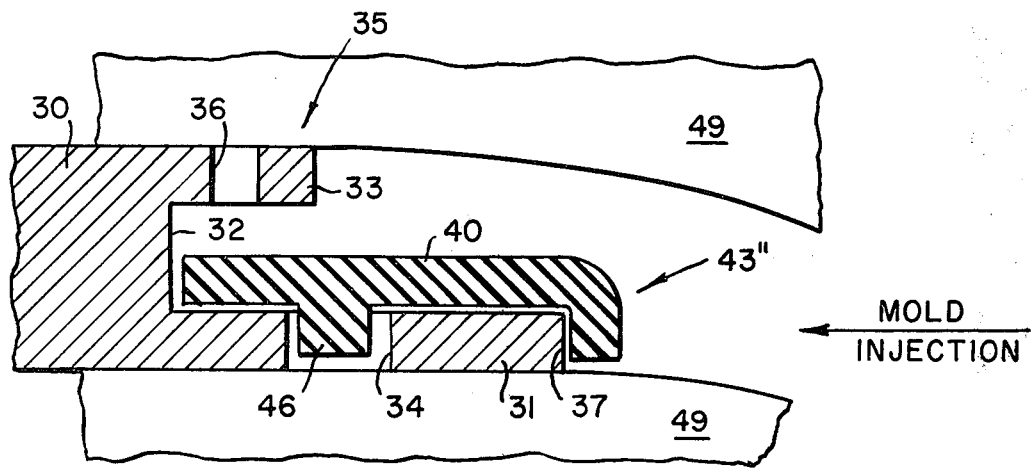

A suitable receiver base 30 shown in FIGS. 1, 4a and 4b, has a marginal end region 35 with a recess 32 separating an inner supporting ring 31 from an outer ring section 33. However, it will become apparent from the description to follow that only a single ring section such as inner support ring 31 is necessary to the novel method and apparatus described herein. The support ring 31 has a plurality of holes 34 spaced about the marginal end region of the ring to provide receiving recesses for the elastomer to expand into in the stress relief aspect of the invention to be described below. Similarly, outer ring 33 has a plurality of holes 36 spaced about the marginal end region of the ring section to provide recesses for the plastic 50 to flow into and fill in the interlocking aspect of the invention to be described below. The support ring 31 terminates in a sharp corner at its forward end. Any receiver having a reasonably regular cross-sectional shape may be selected to practice this invention. By way of illustration, a receiver having an elliptically shaped cross section would be just as suitable as one having a circularly shaped section. The size of the receiver base ring may be extremely small, as in applications where lids are to be placed onto jars and where covers are to be placed on ordnance fuze covers, or fairly large, as in applications where elliptical domes are to be provided for use in windows on homes. No limitation is placed on the size of the receiver base, but the amount of elastomer required to cushion any given fitment would be appropriately adjusted to reflect change in support ring area to be covered and recess holes to be filled.

The cushion ring 40 is selected from any low durometer rubber, elastomer, or any other non-rigid material. Rubber is desirable from the standpoint that it is low in cost and can be directly injection molded to form any desired shape. Rubber also has the desirable properties of being heat resistant and resilient. The cushion ring can be placed about the receiver support ring directly by a molding operation or by a "snapping-on" of a pre-formed band. The general approach in using either method described is to determine how much elastomer would be required to cushion the shrinkage of a known volume of heated thermoplastic upon cooling about the support ring.

Figure 3C:
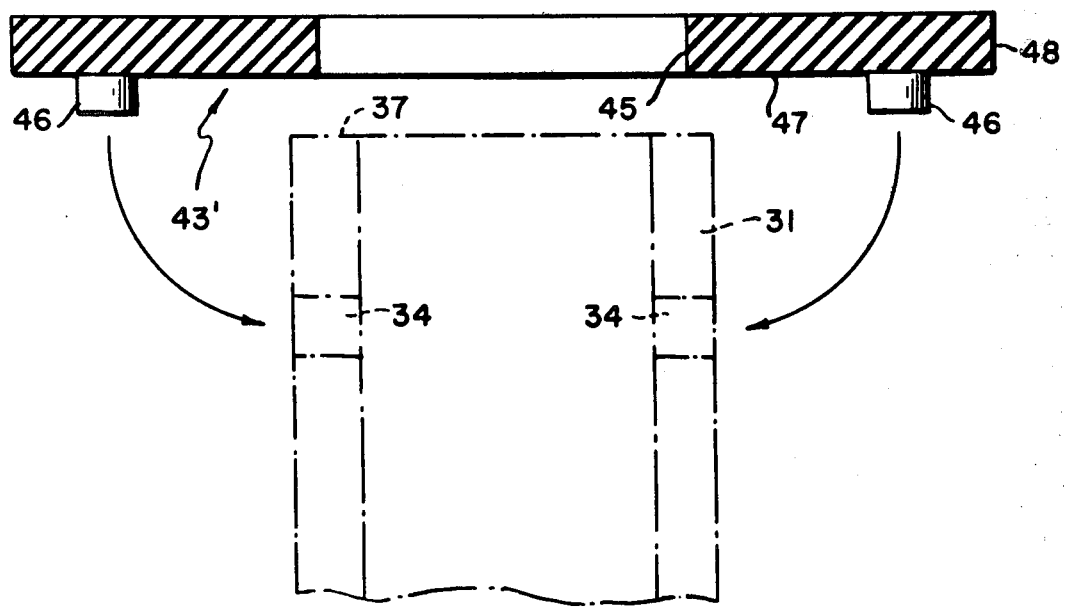

FIGS. 2, 3a, 3b illustrate two suitable representative configurations of preformed snap-on elastomer bands. A "band"-shaped elastomer 41 is shown in FIG. 2 as having a plurality of protrusions 42 inwardly directed and spaced as to fit within the holes 34 of the support ring. Most suitably the band would be made so as to provide a snug fit with the support ring after being snapped-on. A "washer"-shaped elastomer 43 is shown in FIGS. 3a, 3b, and 3c. FIGS. 3b and 3c are sectional views of suitable washer configurations, and FIG. 3a is an exploded cut out view of a washer section. The diameter of the cut out 45 is sized to fit over the support ring. Spaced about on a bottom surface are a plurality of protrusions 46, spaced to fit within the holes 34 of the support ring. As shown in FIG. 3c the cut out 45 may be uniform through washer 43' thickness 48. The washer interior thickness may be variable and present a tapered profile from the cut out diameter, as shown in FIG. 3a and 3b. A desirable result of using a tapered thickness adjacent the cut out 45 as in FIG. 3b arises during the molding process. The thermoplastic is injected into the mold shape under high pressure and could have a possible tendency to lift the leading edge of the washer from the support ring. By using a washer profile with its thickness tapering sharply toward the washer cut out, such potential flare-up is eliminated. See FIG. 4a. A desirable support ring would have a sharp 90° edge in conjunction with this washer. The diameter of cut-out 45 may be slightly less than the support ring diameter 31 to ensure a snug fit.

FIG. 4a and 4b show snap-on elastomer washers in place on the support ring 31 with the receiver base 30 positioned in an injection molding machine 49, known in the art. FIG. 4a shows the washer 43 of FIG. 3b with its linearly tapered thickness in position on the base 30. Referring to FIG. 3b, the washer 43 is shown adjacent to a support ring 31, shown by means of phantom lines. The washer is installed by slipping the cutout 45 about the shoulder 37 and then rotating it downwardly (relative to FIG. 3b) onto the ring 31 until the washer's bottom surface 47 snaps-on to the circumference of the support ring 31 with the spaced washer protrusions 46 positioned within the support ring holes 34. By making the snap-on elastomer bands seamless in construction and by so designing them to fit snugly onto the support ring, an effective seal and moisture barrier is created as the plastic fitment shrinkingly fits upon cooling about the support ring. FIG. 4b shows a slightly different washer 43" that does not terminate flush with the top of shoulder 37 of ring 31 but is disposed slightly over the shoulder. Additional cushioning of plastic shrinkage would be afforded by this configuration.

In any elastomer configuration that is designed to be snapped-on, as well as those which are directly molded, no adhesives or bonding agents of any kind are required. The only surface preparation required is that the support ring surface be reasonably clean and free of oil or dirt.

Fitment cover 50 (see FIG. 1) may be formed with any suitable thermoplastic material by any standard injection molding machine directly onto a receiving base 30. Depending on the intended application and the environment of use, almost any injection moldable thermoplastic is suitable. By way of example but not by means of exclusion, for more vigorous environmental uses acrylonitrile-butadinee-styrene (ABS), acetal, acrylic, nylon, polycarbonates, glass filled polyester, polyethylene, polypropylene, polystyrene and polyvinylchloride (PVC) may be used. For use in ordnance, and in particular with respect to proximity fuzes, an acetal homopolymer manufactured by E.I. duPont de Nemours and Co., Wilmington, Delaware, trademarked and marketed as DELRIN, and a polycarbonate manufactured by General Electric Plastics Business Division in Massachusetts, trademarked and marketed as LEXAN, are satisfactory thermoplastics which could be selected. Various polystyrenes could also be used if made tougher. Lexan, although somewhat expensive, is especially valuable as a replacement for glass in applications calling for visually transparent domes. Delrin is slightly tan colored and would not provide a transparent fitment. However, both are "transparent" to the transmission of electromagnetic signals and thus both would be suitable for use in proximity fuzes.

In order to form a stress relieved fitment according to this invention, the receiver base is positioned in an injection molding machine with the longitudinal axis of the receiver base oriented and aligned with the injection flow direction of the thermoplastic. See FIG. 4a and 4b. By orienting the receiver base in this manner, the heated thermoplastic thus injected into the mold form will fill the receiver base recess area first and will then proceed to fill the remainder of the fitment shape. Due to the rapid cooling that occurs in the plastic as it flows from the injector into a mold, circumferential injection of the thermoplastic with respect to the receiver does not produce satisfactory results. With circumferential injection a small sealing line forms where the plastic meets after it has flowed around the surface of the receiver. This junction would produce a line of weakness and hence would be prone to crack formation. The support ring of the receiver may be preheated to reduce thermal differences if desired, but is not necessary to the teaching of this method. Some advantage may be gained by a preheating since thermal stresses may tend to be distributed more evenly in some dome applications, but may be disadvantageous in a rapid mass production operation since the resulting fitment may be too hot for personnel to handle immediately after the injection.

The crack elimination principle is based on the compression of a cushioning ring 41 or 43 of elastomer which adapts to the outer circumference of the receiver. Because of the differing thermal properties of the dissimilar material to which mating may be desired, in most situations, preheating the support ring in expectation of uniform contraction upon cooling of the combination thus formed during a cooling would not be realistic. Thus providing the band of elastomer with protrusions and the supporting ring with mated receiving holes for the elastomer allows for a gradual shrinkage of the thermoplastic dome and allows for a more even distribution of stresses which are normally formed by the cooling and shrinkage about a relatively non-yielding surface to be dissipated over a time period.

In addition to providing a crack-eliminated fitment, the elastomer also provides an effective moisture barrier seal. As the fitment shrinkingly cools, the elastomer is firmly compressed about the support ring, thereby forming a tight seal. In many devices of ordnance the fitment will be subjected to and be expected to withstand severe operational evironments. Proximity fuzes may be projected outwardly from breeches under extremely high trajectory and rotational velocities. Experience has shown that some additional fitment support is necessary to resist the shear stresses that would be imposed. Additional locking of the fitment to receiver base can be achieved with the teaching of this invention by providing the receiver base with a second outer ring 33 having a plurality of holes 36 about a marginal end. By the method described herein, as the thermoplastic is injected into the mold, the plastic will flow into the mold, filling the mold, and also flling the holes 36 of the outer ring. See FIG. 1. As the injected plastic cools, a fitment with increased resistance to shear stresses and with an improved interlocking of receiver to fitment will be formed.

In one particular embodiment of the method there is formed an improved stress relieved fitment which provides an interlocking seal between a receiving base and a thermoplastic fitment. The receiver base, having a tubular support ring with holes spaced about a marginal end, is brought into working relationship with an elastomer injection molding machine. A mandrel holdingly positions the receiver while a layer of elastomer is molded directly onto the support ring, thereby depositing a cushion of elastomer which forms a band about the circumference of the ring and which also fills the holes of the ring. The combination of receiver with elastomer is then removed and placed into working relationship with a plastics injection molding machine provided with the desired fitment mold shape. The plastic selected, heated and under pressure, is then directly injected into the mold until the confines of the mold shape have been filled, thereby forming the desired fitment. As the combination is allowed to cool, the fitment shrinks and tends to compress the elastomer about the support ring. The elastomer allows the fitment stresses to be gradually relaxed and their severity dissipated over a longer time span to achieve a favorable stress equilibrium. Due to the elastomer absorbing the compressional deformation of the fitment shrinkage, thermal stresses due to differences in the cooling rate of dissimilar materials are relieved and fitment cracks are eliminated. An improved interlocked fitment is achieved by providing the receiver base, as in FIG. 1, with a secondary outer ring 33 with circumferentially spaced holes for the plastic to flow into as the mold is filled, as shown in FIGS. 4a and 4b.

As another embodiment of the method, the elastomer may be pre-formed, as shown in FIGS. 2-3a–3c, and 4a–4b, and then directly snapped-on to the support ring, thus not requiring the elastomer injection molding step above described. Here the suitable pre-formed elastomer is snapped-on to (i.e. the inner washer cutout diameter fitted over) the end of the receiver base support ring and the protrusions on the pre-formed band positioned within the holes of the support ring. The combination is then placed into working relation with an injection molding machine, as described above, and the thermoplastic fitment is directly molded and formed on the receiver base, as described above.

Obviously, numerous modifications and variations of the present invention are possible in light of the above teachings. It is therefore to be understood that within the scope of the appended claims the invention may be practiced otherwise than as specifically described herein.

What is claimed as new and desired to be secured as Letters Patent of the United States is:

1. A stress-relieved, molded hollow cover, comprising:

A support ring having a marginal recess area;
An elastomer band disposed within said marginal recess surrounding a portion of said support ring;
A hollow portion of thermoplastic material injection molded directly about and enveloping the band of elastomer, interlocked with said ring and axially extending from said ring, said hollow portion cooperating with said ring to form said hollow cover.

2. A stress relieved fitment as recited in claim 1 wherein the marginal recess of said support ring has spaced thereon a a plurality of holes to receive elastomer compression.

3. A stress relieved fitment as recited in claim 2 wherein said elastomer is in a pre-formed shape having protrusions disposed on one surface to matchingly position within said support ring spaced holes.

4. A stress relieved fitment as recited in claim 3 wherein said pre-formed elastomer is cylindrical in shape and said protrusions are disposed inwardly on an interior surface of the cylinder.

5. A stress relieved fitment as recited in claim 3 wherein said pre-formed elastomer is in the shape of a washer disposed to fittingly snap over the support ring marginal recess and having a plurality of protrusions on a surface of said washer receivable within said spaced holes thereon.

6. A stress relieved fitment as recited in claim 5 wherein said washer has a variable thickness adjacent to a central cutout.

7. A stress relieved fitment as recited in claim 5 wherein a portion of said elastomer washer extends over the shoulder of said support ring.

8. In the injection molding of a plastic fitment directly onto a support ring having a tubular end region to receive the fitment, a method for reducing the formation of hoop stresses and thereby eliminating fitment cracks comprising the steps of:

a. providing said support ring tubular end region with a plurality of holes spaced about a marginal recess;
b. placing the support ring into working relationship with an injection molding machine;
c. providing a layer of elastomer surrounding said support ring end region;
d. placing a fitment mold about the support ring end section;

e. injecting a heated thermoplastic directly into the mold and surrounding said elastomer and allowing the thermoplastic to fill the mold;

f. allowing the thermoplastic to cool about said support ring; and g. removing said directly molded thermoplastic fitment from said injection machine.

9. A method as recited in claim 8 wherein step (c) includes:

h. placing a preformed band of elastomer having a plurality of spaced protrusions on said support ring marginal end recess, said spaced protrusions being received within said spaced support ring holes.

10. A method as recited in claim 8 wherein step (c) includes:

i. placing a preformed elastomer mold about said support ring;

j. injecting an elastomer into said pre-form mold and allowing the mold and said support ring spaced holes to be filled with said elastomer; and k. removing said elastomer mold.

11. In the injection molding of a plastic fitment directly onto a receiver base, said receiver base having two tubular ring sections to receive the fitment, a first inner support ring section and a second outer ring section, each of said ring sections having a plurality of holes spaced about a marginal end region of said tubular sections, a method for eliminating hoop stresses and thereby eliminating fitment cracks and for sealing interlockingly together the fitment with the support ring, comprising the steps of:

placing the receiver base into a working relation with an injection molding machine;

placing a pre-formed elastomer mold about the inner support ring;

injecting an elastomer into said pre-form mold and surrounding a portion of said support and allowing the mold and said support ring spaced holes to be filled with said elastomer;

removing said elastomer mold;

placing a fitment mold about the support ring end section;

injecting a heated thermoplastic directly into the mold and surrounding said elastomer, and allowing the thermoplastic to fill the mold and the outer support ring spaced holes;

allowing the thermoplastic to cool about the support ring; and removing said directly molded thermoplastic fitment from the injection machine.

* * * * *